US007756601B1

(12) United States Patent
Van Dyke et al.

(10) Patent No.: US 7,756,601 B1
(45) Date of Patent: Jul. 13, 2010

(54) INTUITIVE CONTROLLER FOR VERTICAL LIFT ASSIST DEVICE

(75) Inventors: Todd Van Dyke, Aurora, OH (US); Marc W. Yanko, Aurora, OH (US)

(73) Assignee: R.P. Gatta, Inc., Aurora, OH (US)

( * ) Notice: Subject to any disclaimer, the term of this patent is extended or adjusted under 35 U.S.C. 154(b) by 0 days.

(21) Appl. No.: 11/713,604

(22) Filed: Mar. 5, 2007

(51) Int. Cl.
*G06F 7/00* (2006.01)

(52) U.S. Cl. ........................ 700/213; 187/200; 414/541

(58) Field of Classification Search ................. 700/213; 187/200, 201, 247, 250; 414/228, 540, 541, 414/545, 546, 921
See application file for complete search history.

(56) References Cited

U.S. PATENT DOCUMENTS 5,037,267 A 8/1991 Warner et al.
5,443,151 A 8/1995 Taylor
5,452,981 A * 9/1995 Crorey et al. ............ 198/468.6
5,694,857 A 12/1997 Taylor
5,799,581 A 9/1998 Taylor
6,204,620 B1 3/2001 McGee et al.
6,269,944 B1 8/2001 Taylor
6,312,211 B2 11/2001 Tranchida
6,313,595 B2 11/2001 Swanson et al.
6,575,317 B2 6/2003 Taylor
D477,901 S 7/2003 Robinson
6,612,449 B1 9/2003 Otani et al.
6,668,668 B1 12/2003 Peshkin
6,738,691 B1 5/2004 Colgate et al.
7,140,830 B2 * 11/2006 Berger et al. ................ 414/699
7,341,521 B1 * 3/2008 Patterson ...................... 463/38
2002/0111712 A1 8/2002 Peshkin et al.
2002/0112016 A1 8/2002 Peshkin et al.
2004/0026349 A1 2/2004 Colgate et al.
2004/0063025 A1 * 4/2004 Natori et al. ............. 430/270.1
2004/0068347 A1 * 4/2004 Aalund et al. ............... 700/245
2004/0083025 A1 * 4/2004 Yamanouchi et al. ....... 700/213
2005/0207872 A1 * 9/2005 Taylor et al. ................... 414/1

* cited by examiner

*Primary Examiner*—Gene Crawford
*Assistant Examiner*—Ramya Prakasam
(74) *Attorney, Agent, or Firm*—John D. Gugliotta, PE, Esq.

(57) ABSTRACT

A vertical control mechanism for a vertical lift assist device is provided in which a rotational twist grip element is in direct communication with a control signal that generates analog input signals corresponding to an operator's intended vertical destination of an end-effector. A vertical lift mechanism is thereby controlled to provide a vertical assist lifting force that assists an end-effector in the manipulation of a load.

10 Claims, 8 Drawing Sheets

INTUITIVE CONTROLLER FOR VERTICAL LIFT ASSIST DEVICE

RELATED APPLICATIONS

The present invention improves on the Practical Intelligent Assist Device described in U.S. Ser. No. 11/004,509, filed on Dec. 6, 2004, and herein incorporates '509 by reference as if fully rewritten. As such, the present invention claims any available benefit as a Continuation-in-Part.

BACKGROUND OF THE INVENTION

Field of the Invention

Payloads utilized in industrial applications, i.e. manufacture assembly lines or general material handling situations, may be too large for manual operators to move without a risk of injury. It is even desirable to provide these operators with mechanical assistance when moving lighter loads to avoid operator strain and fatigue, to avoid injuries sustained by repetitive motions and to move and assemble the load more rapidly. To overcome the risks of injury and the disadvantages of a slowed assembly, a great number of personal assist devices have been designed to conduct industrial assembly and material handling work.

The complex types of personal assist devices that move a payload are known as Intelligent Assist Devices ("IADs"). IADs are devices capable of being automated to assist a human operator in the movement of a payload about a multiple axis. The simplest type of personal assist device is a cable hoist. A cable hoist is a pneumatic or an electrically operated lifting mechanism that is vertically adjustable to provide increased mechanical advantage to an operator's lifting capacity. One disadvantage to this device is that it is not delicate in its controls and, more specifically, its controls provide for little to no automation. It comprises a binary mechanism that actuates a control that moves the device either up or down at one relative speed.

Hoist devices that utilize force-based control mechanisms to move vertically present problems when an operator is required to grapple, manipulate and release loads in varying directions. One solution is to comprise a device with a pneumatic balancer that is initially balanced to take into account its own weight and the weight of a fixed load so that it can be easily manipulated. Pneumatic balancers typically consist of a motorized take-up pulley, a line that wraps around the pulley as it turns and an end-effector that attaches to the end of the line. The end-effector comprises components that connect to the load being lifted. In operation, the pulley's rotation winds or unwinds the line to cause the end-effector to lift or lower the load connected to it. An actuator generates an upward line force that is exactly equal to the gravity force of the load being lifted so that the tension in the line balances the load's weight. Thus, the only force that the operator must impose on the load to maneuver it is the load's acceleration force. The acceleration force can be substantial if the load's mass is large. Therefore, the acceleration or the deceleration of a heavy load is limited by an operator's strength; however, once the load is unloaded, the counterbalancing force must be adjusted to provide for a lesser force. The adjustment is accomplished by means of venting or otherwise relieving the pneumatic lifting fluid. In order for such a device to perform its intended function, it must comprise dual set-points that compensate between the weight of the unloaded end-effector and the additional weight of the loaded end-effector. Once the device is unloaded, the additional compensating force will cause the device to accelerate upwards if it is not adjusted.

While the operation of a cable hoist is not generally effected by variable weight loads, pneumatic balancers do not operate as well when switched to accommodate loads varying in sizes and masses. Adjustment applications to switch loads require a need to rebalance and a need to reset the set-points. A decreased response time is a disadvantage to switching between known, discrete set-points. Moreover, a load having characteristics inconsistent with the previously set balancing point requires the operator supply additional force in the form of physically pushing and physically pulling the load to lift it or to drop it.

Because hoists do not function well as balances, and balances do not function well as hoists, a need exists for a means to provide a vertical control scheme that is able to seamlessly adapt to variations in a vertical load. Consequently, a need has been long felt for a vertical controller having an operation that is direct and easy, while at the same time, having an operation that is capable of acceleration without requiring its operator supply additional force.

SUMMARY OF THE INVENTION

It is therefore an object of the present invention to provide an improved vertical lift mechanism to be utilized in industrial manufacturing settings.

It is a feature of the present invention to provide a vertical lift mechanism that comprises an improved vertical controller which utilizes a twist grip man-machine interface. It is envisioned that the improved vertical controller is clearly and ergonomically designed both to provide a system that is efficiently used and to ensure safety to its operator.

Briefly described according to one embodiment of the present invention, a vertical control means for an intelligent assist device is provided that can be utilized with many variations of end-effectors, but most specifically, with an end-effector that needs to be adapted to vertically manipulate various and variable weight loads. A pneumatic cylinder, driven by compressed air, is the means to lift a particular load.

In order to adapt the previous devices for the uses anticipated for the present device, either a number of different sized pneumatic cylinders or a number of different set-points need to be utilized in conjunction with a means that is capable of switching the cylinders or the set-points. The present invention eliminates the complex need for a switching means by utilizing a continuous control twist grip to directly drive a control signal air pressure from a precision control regulator. Twisting of the control grip proportionally varies the pilot drive pressure. The operator can continuously change the set-point by merely twisting the control grip to proportionally vary the pilot drive pressure and thus increase or decrease the control signal air pressure.

A major advantage of the present invention is the ability to provide an intuitive, fine control for vertically lifting a heavy load at a relatively fast lifting speed.

An additional advantage of the present invention is its decreased cost of implementation as compared to conventional strategies, i.e. utilizing multiple pneumatic cylinders, utilizing multiple programmed set-points or utilizing combinations of balancers and hoists.

A further advantage of the present invention is the increased vertical control speed.

Yet another advantage of the present invention is the increased finesse or the delicacy available in controlling the end effector, especially in the transition between the lifting and the placing movements to be accomplished by the operator.

Further, the present invention allows for a smooth, a synchronous and quick transition from the steps of quickly lifting a variable load, delicately manipulating and placing the load, releasing the load and reloading the end-effector.

BRIEF DESCRIPTION OF THE DRAWINGS

The advantages and the features of the present invention will become better understood with reference to the following more detailed description and the claims taken in conjunction with the accompanying drawings, in which like elements are identified with like symbols, and in which:

DESCRIPTION OF THE PREFERRED EMBODIMENTS

Figure 1:
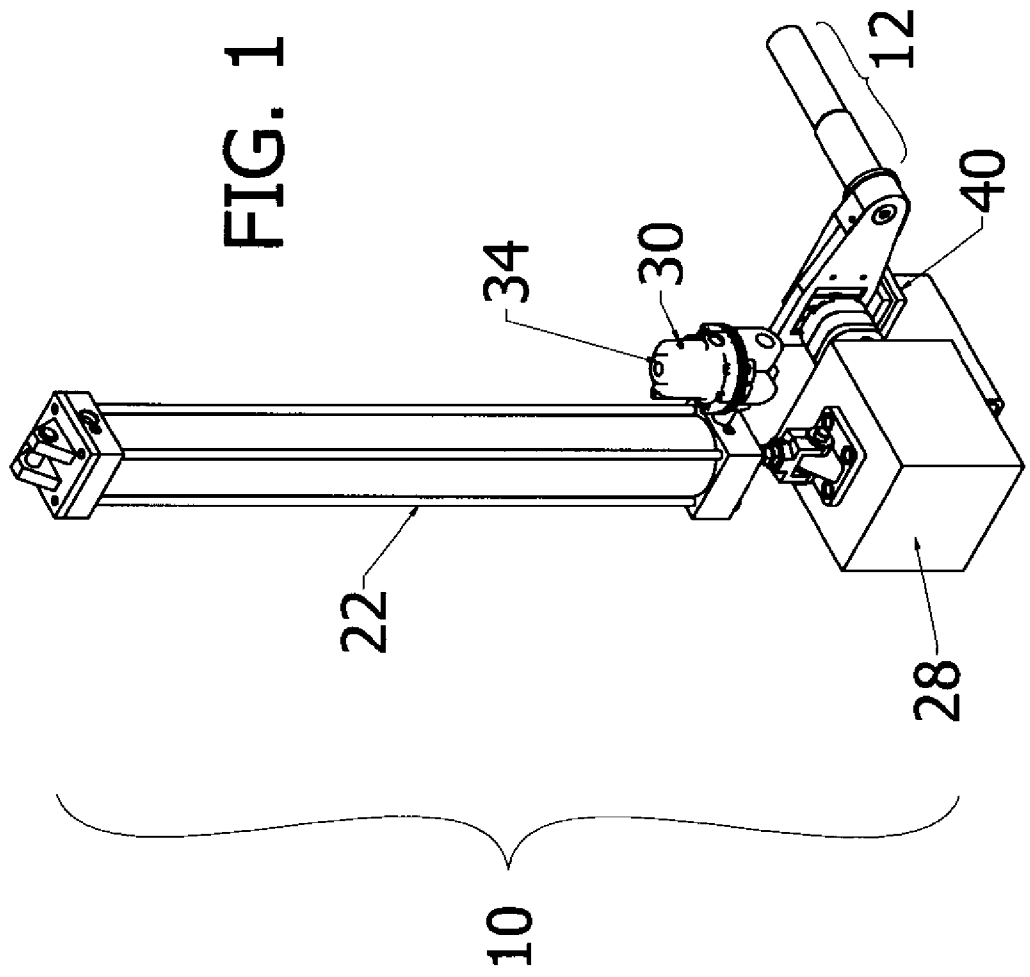
FIG. 1 is a perspective view of a vertical lift controller for an intelligent assist device shown in conjunction with a pneumatic vertical lift device according to a preferred embodiment of the present invention.
Figure 2:
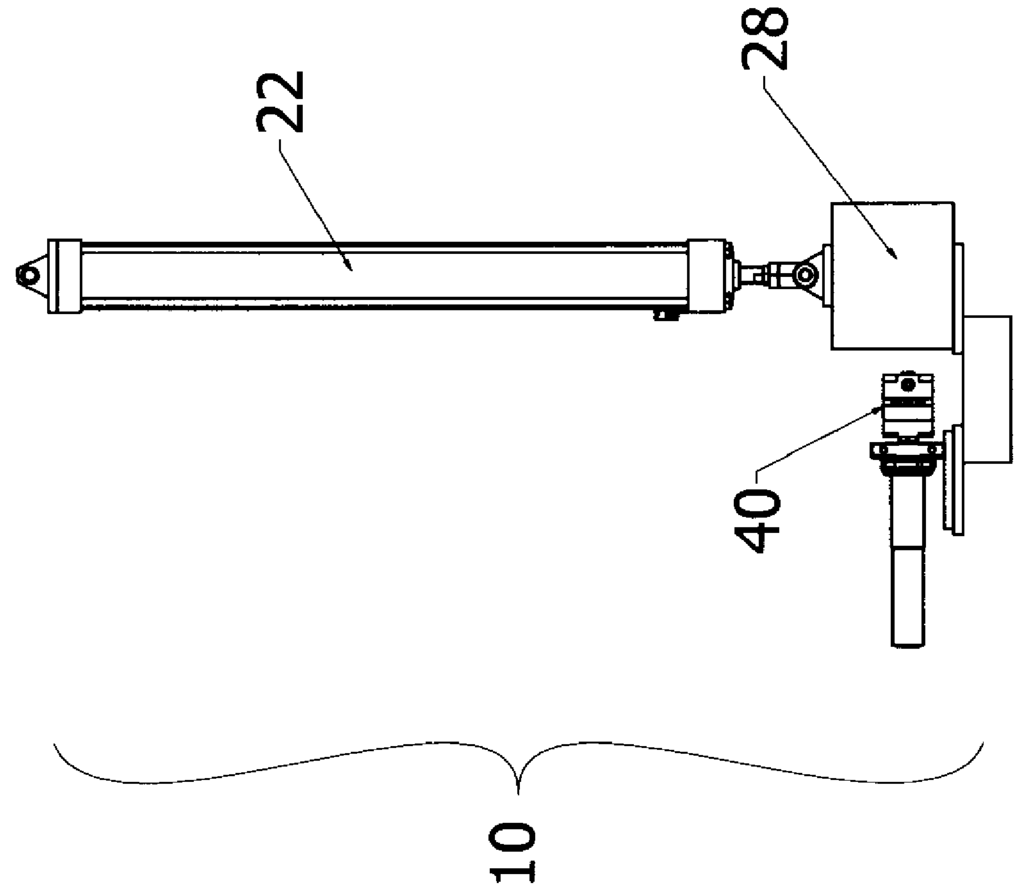
FIG. 2 is a front elevational view thereof.
Figure 3:
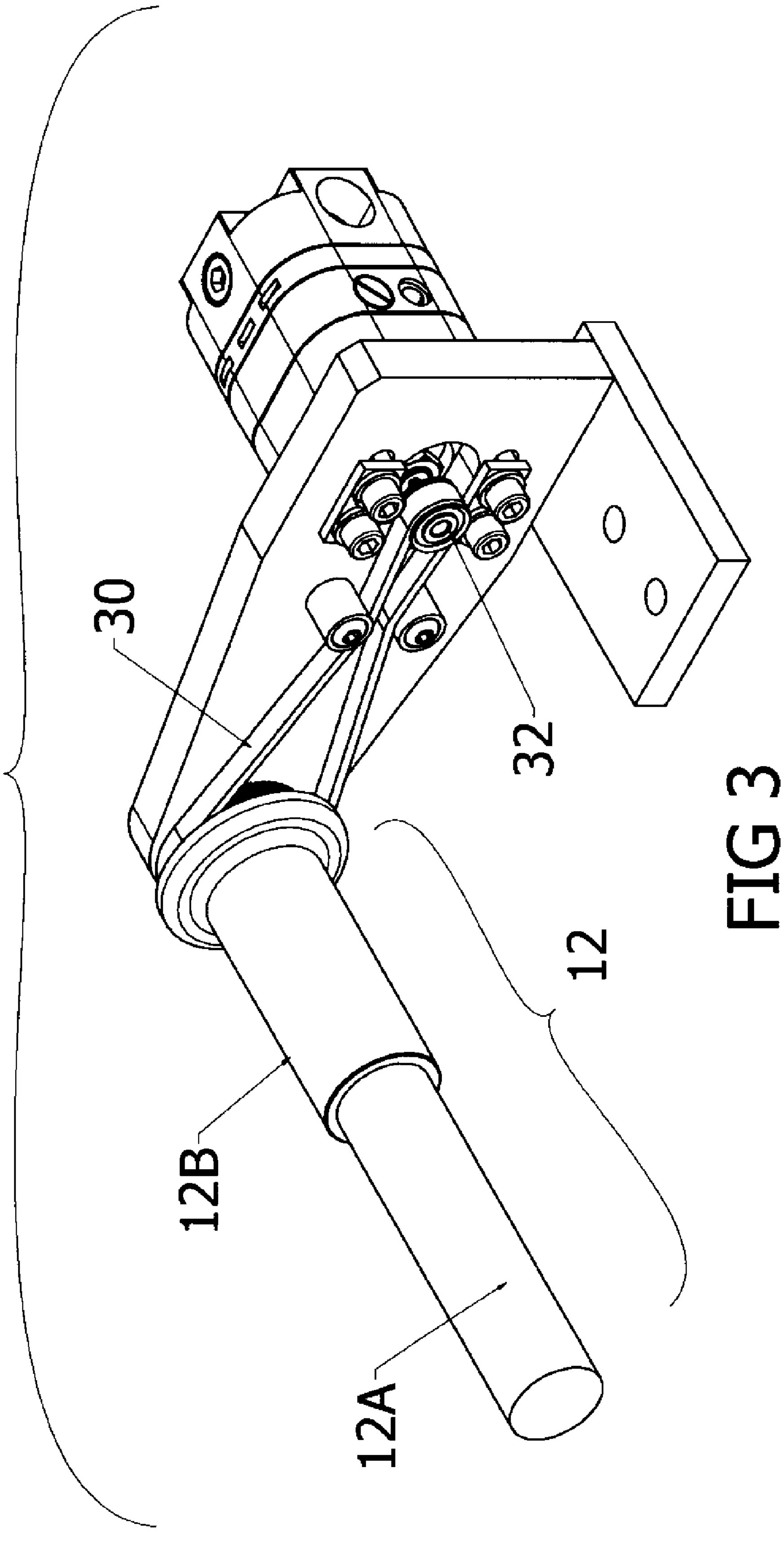
FIG. 3 is a rear, left-side perspective view of an intuitive manual controller for a vertical lift device according to a preferred embodiment of the present invention.
Figure 4:
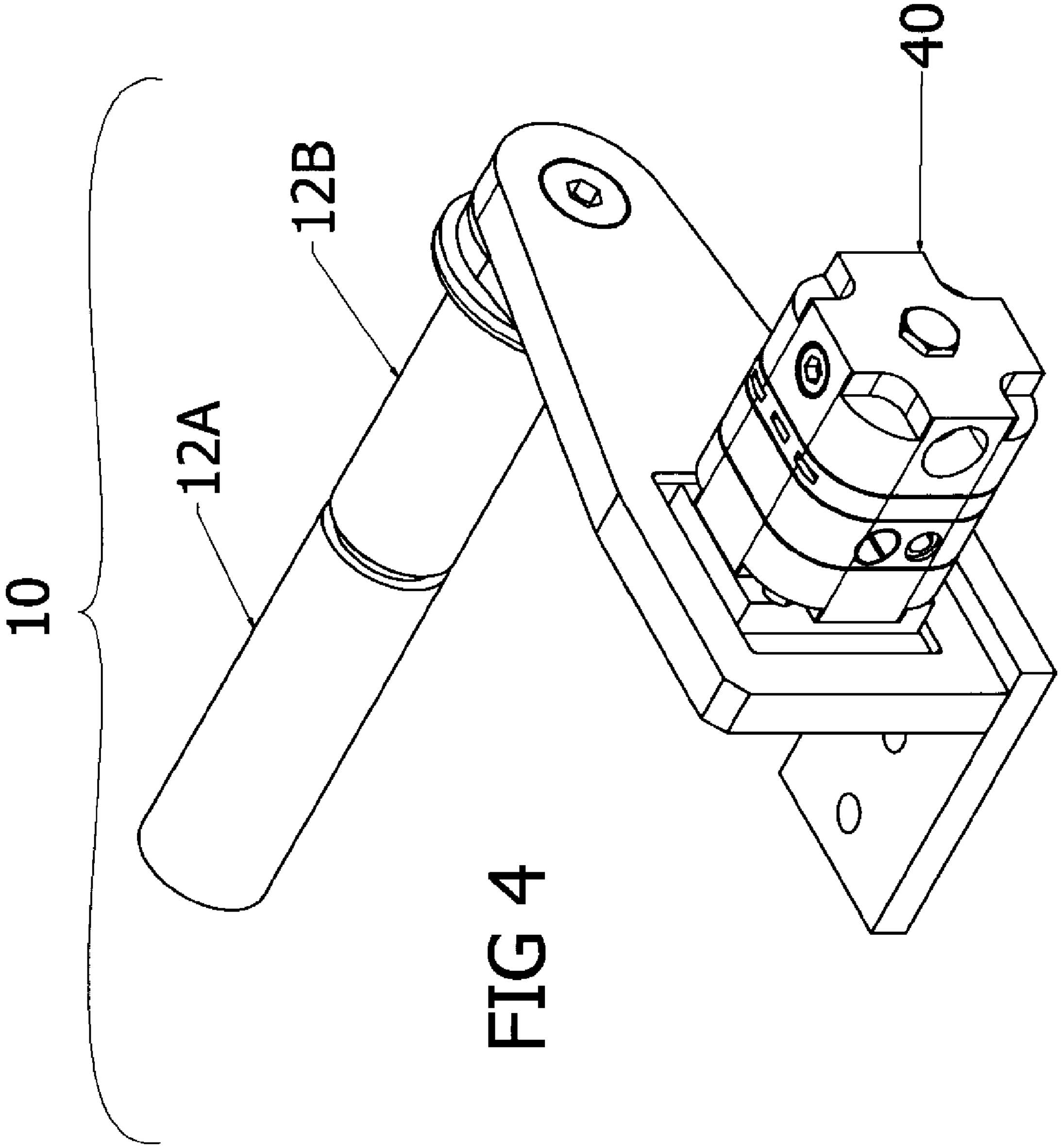
FIG. 4 is a rear, right side perspective view thereof.
Figure 5:
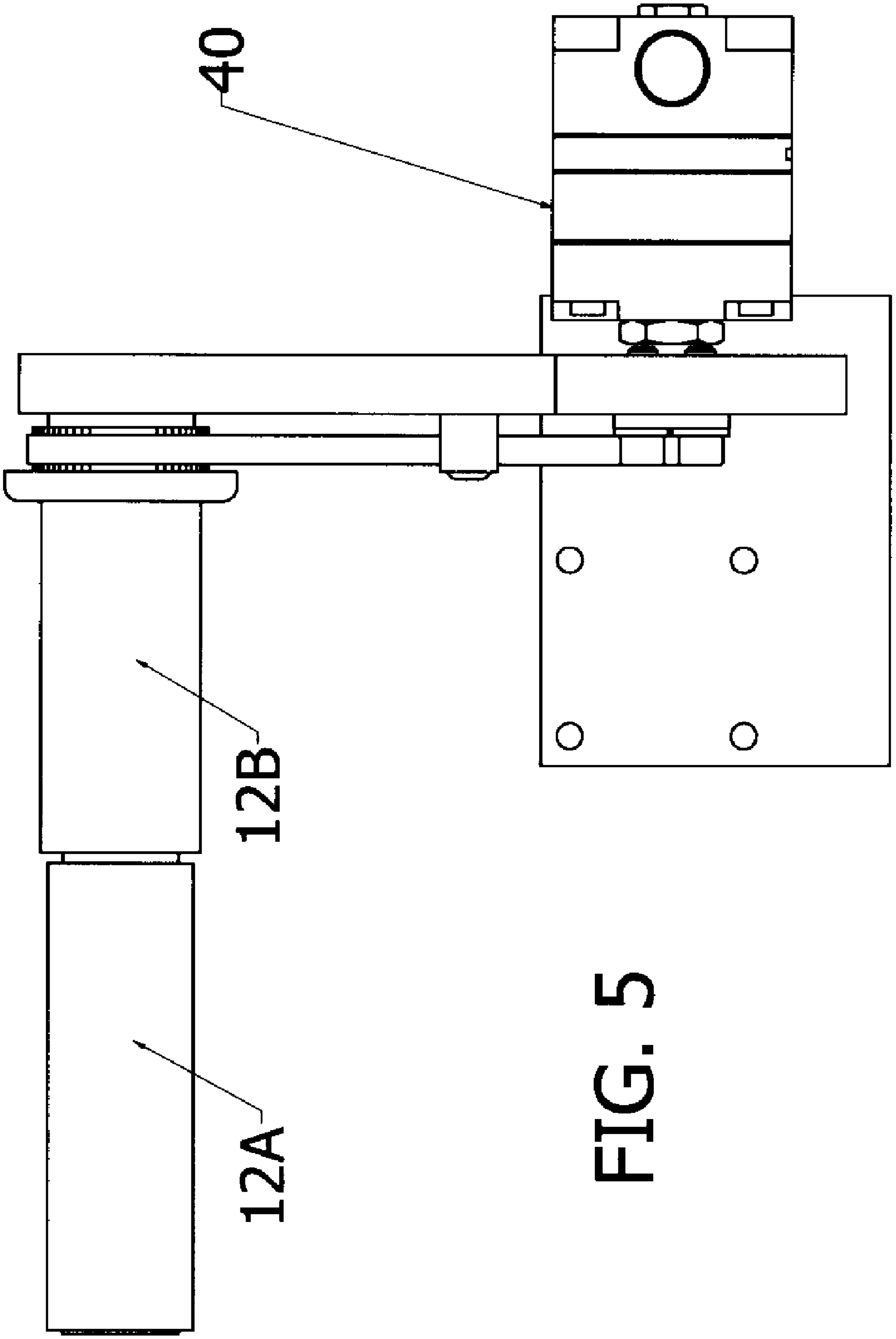
FIG. 5 is a front elevational view thereof.
Figure 6:
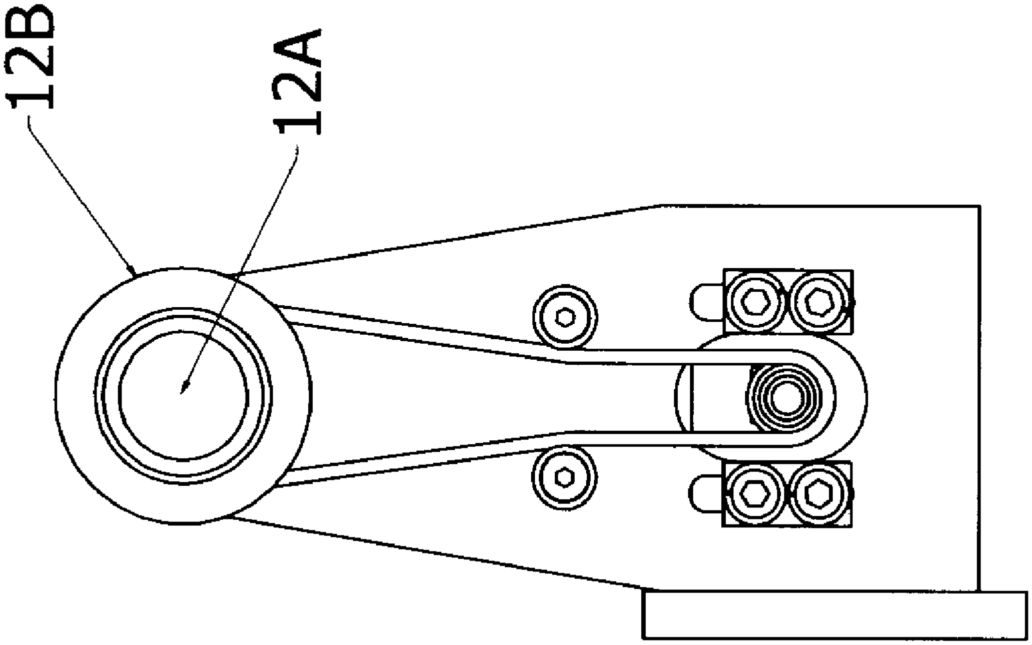
FIG. 6 is a detailed side elevational view thereof.
Figure 7:
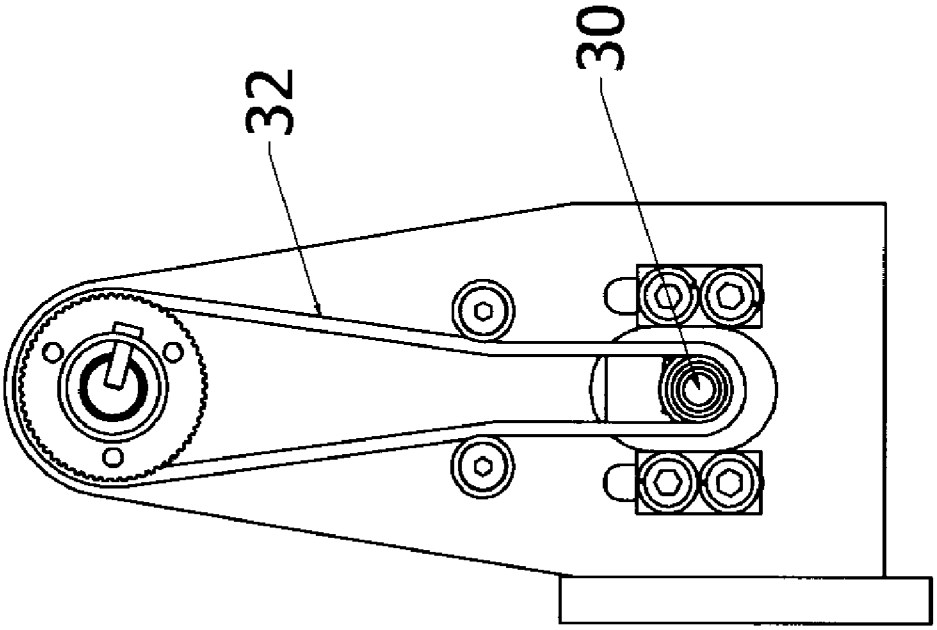
FIG. 7 is a detailed view of FIG. 6 shown without a handle mechanism.

It is particularly important that an operator can unambiguously communicate a desired operation to a vertical assist device. Ease and intuitiveness in the operation are both necessary for achieving high levels of productivity. Because the safety of the operator is a significant concern, attention is made to the operator's controls such that any inadvertent or any mistaken changes in the modes of operation are minimized. As such, the following embodiments are designed to comprise fail-resistant ergonomics that form parts of the improvements. For purposes of an enabling disclosure, an exemplary mode for carrying out the invention is presented in terms of a preferred embodiment, herein depicted within the Figures, with such fail resistant ergonomics described herein.

1. Detailed Description of the Figures

Referring now to FIGS. 1-7, an intuitive control device 10 is shown having a user grip element 12 for use with a vertical lift mechanism 22. The grip element 12 comprises a stationary support component 12A that supports a twist grip component 12B. The vertical lift mechanism 22, shown herein as a pneumatic lift cylinder, attaches to an overhead rail support (not shown). The vertical lift mechanism 22 provides a vertical assist lifting force to assist an end-effector (not shown) in manipulating a load in an otherwise conventional manner. It is anticipated that the vertical lift mechanism 22 is laterally movable and, as such, it can travel in all spacial directions within the manufacturing environment. It is further anticipated that a number of interchangeable end-effectors can be utilized.

The vertical control mechanism is operated and controlled by means of the grip element 12. The grip element 12 is in direct mechanical communication with a vertical lift operator control regulator 40. Although functional equivalents exist, for the purposes of disclosing the enablement of an exemplary preferred embodiment, the vertical lift operator control regulator 40 is a precision regulator that incorporates a pressure adjustment shaft provided as the means to control and regulate the inlet supply air 42. A precision regulator, such as the Numatics® R80/82 series, and specifically model R820-02FG, provides the required functionality. A precision regulator utilizes a pressure adjustment shaft 30. A timing belt 32 directly connects the grip element 12 to the adjustment shaft 30. The grip element 12 directly controls the vertical lift operator control regulator 40 by regulating the inlet supply air 42, which is supplied from a utility air source 44, and regulating the discharged supply air 46.

Figure 8:
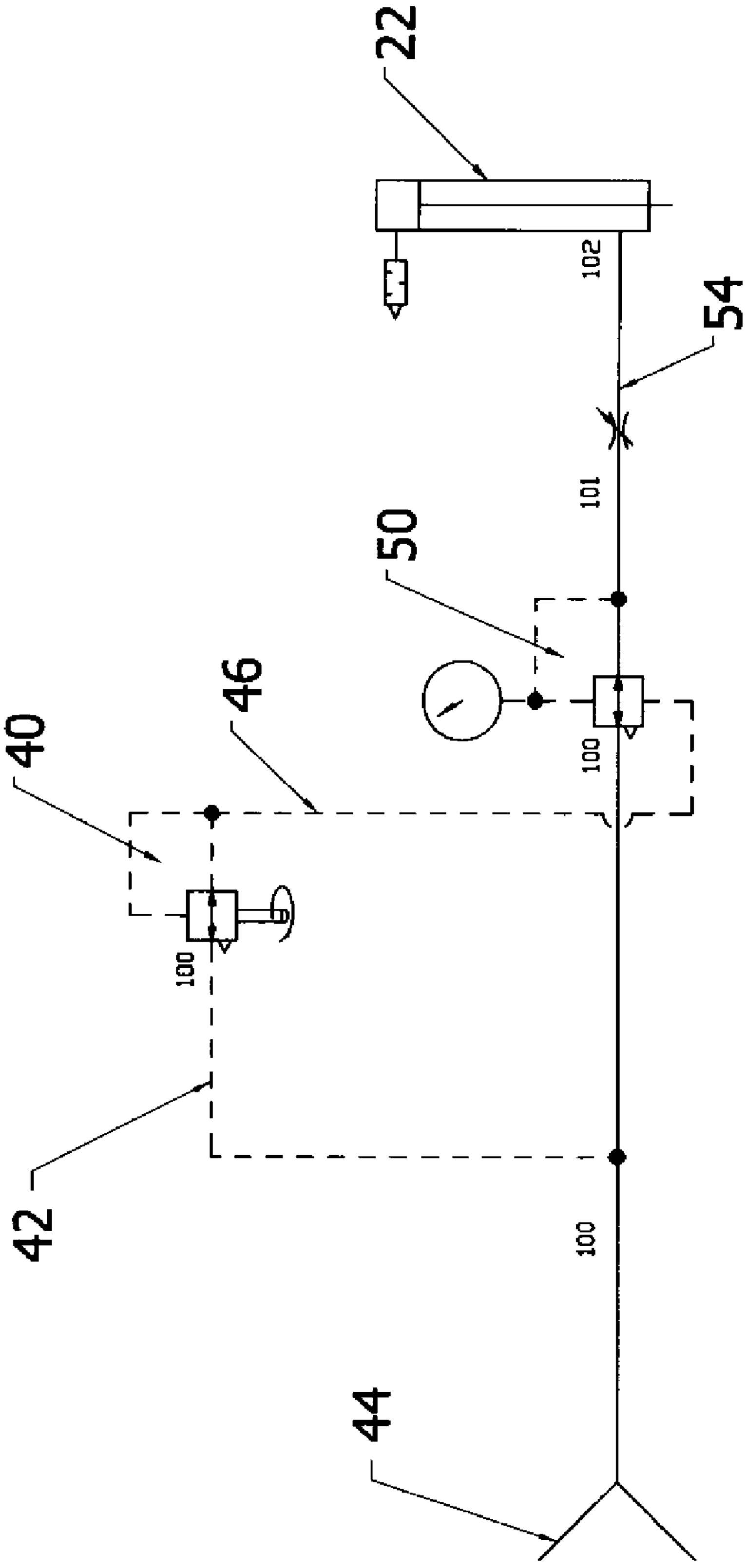
FIG. 8 is a pneumatic flow diagram for the present invention.

The supply air 42, 46 is a direct function of and is accurately regulated by the twist grip component 12B. As best shown in FIG. 8, the regulated, discharged supply air 46 functions as a transducer signal utilized by a vertical lift pilot operated regulator 50. A relay regulator, such as a Marsh BellorFram Type 75 series, provides the required functionality because it utilizes the transduction signal 46 to accurately control an output driving pneumatic force 54. The pneumatic force 54 is proportional to the transducer signal 46 and provides the lifting force in the operation of the vertical lift mechanism 22.

2. Operation of the Preferred Embodiment

The vertical control device 10 is shown in greater detail in FIGS. 3-7. The vertical control device 10 functions to receive the operator's inputs and to provide intent commands to the control mechanism. The control mechanism is affixed to the lift mechanism 22 in a position (relative to the end-effector) that allows the operator to easily view the end-effector so as to properly guide and control the device thereto. It is anticipated that the operator vertical control inputs are provided by a user grip element 12 comprising a stationary support component 12A that functions as a supporting shaft onto which a twist grip component 12B rotates.

This results in an intuitive form of motion; if the operator rotates the twist grip 12B in one direction, i.e. forward, the vertical lift operator control regulator 40 increases the regulated supply air 46, which increases the output 54 of the vertical lift pilot operated regulator 50. The vertical lift cylinder 22 and the end effector travel upwards in a smooth manner that is proportional to the amount of upward twist (i.e., twisting hard causes fast upward motion, twisting gently causes slow upward motion). A forward rotating motion engages an upward lift instruction and, as such, becomes a safety feature within the design. Namely, when the grip 12 is lifted, a geometry change between the operator and the machine causes an additional rotation of the grip 12. As such, assigning a rearward rotation (relative to the operator) to direct an upward motion generates an autoregulation of the control signal.

Similarly, if the operator rotates the twist grip 12B in the opposite direction, i.e. rearward relative to the operator, the vertical lift operator control regulator 40 decreases the regulated supply air 46, which decreases the output 54 of the vertical lift pilot operated regulator 50. The vertical lift cylinder 22 and the end effector travel downwards in a smooth manner that is proportional to the amount of downward twist (i.e., twisting hard causes fast downward motion, twisting gently causes slow downward motion).

It should be understood that the present embodiments are not limited to the exemplary embodiments disclosed herein, but that they may also be implemented in other material handling systems including gantry cranes, jib cranes, monorails, articulated systems, etc. Therefore, details regarding the overhead rail system, including the types of material handling hardware, are provided as an example and are not necessary to the invention unless otherwise specified as such.

The foregoing descriptions of the specific embodiments of the present invention have been presented for purposes of illustration and description only. They are neither intended to be exhaustive nor to limit the invention to the precise forms disclosed and, obviously, many modifications and variations are possible in light of the above teaching.

The above embodiments were chosen and described in order to best explain the principles of the invention and its practical application, to thereby enable others skilled in the art to best utilize the invention and its various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A variable control means for a vertical lift assist device comprising:

a rotational twist grip element in direct communication with a means for generating an analog input signal that corresponds to an operator's intended vertical destination of an end effector, said rotational grip element forms a vertical control device for use with a vertical lift mechanism;

wherein said vertical lift mechanism provides a vertical assist lifting force that assists an end-effector in manipulation of a load.

2. The variable control means of claim 1, wherein said rotational twist grip element comprises a stationary support component to support a twist grip component that is mechanically linked to said analog signal control means.

3. The variable control means of claim 2, wherein:

said twist grip component is adapted such that a rotation of the top of the grip component away from the operator initiates an upward motion, and a rotation of the top of the grip component towards the operate initiates a downward motion.

4. The variable control means of claim 2, wherein said twist grip component is in direct mechanical communication with a vertical lift operator control regulator.

5. The variable control means of claim 1, wherein said means for generating said analog input signal comprises a vertical lift operator control regulator.

6. The variable control means of claim 5, wherein a precision regulator incorporates a pressure adjustment shaft for controlling the regulation of inlet supply air.

7. The variable control means of claim 6, wherein:

said rotational grip element directly controls a vertical lift operator control regulator for said inlet supply air, which is supplied from a utility air source, and for regulating the discharged supply air;

said inlet supply air and said discharged supply air are direct functions of and are accurately regulated by said twist grip component.

8. The variable control means of claim 7, wherein said regulated, discharged supply air functions as a pilot signal utilized by a vertical lift pilot operated regulator.

9. The variable control means of claim 1, wherein said rotational twist grip element comprises:

a stationary support component that supports a twist grip component mechanically linked to said analog signal control means, said analog signal control means is selected from the group comprising resolvers and encoders.

10. The variable control means of claim 9, wherein said analog signal control means is in electronic communication with an electronic vertical lift operator control regulator.

* * * * *